United States Patent
De Vleesschauwer et al.

(10) Patent No.: US 7,027,434 B2
(45) Date of Patent: Apr. 11, 2006

(54) METHOD TO HAVE A REAL TIME DATA COMMUNICATION

(75) Inventors: Danny De Vleesschauwer, Evergem (BE); Jan Janssen, Rumst (BE); Fabrice Poppe, Ghent (BE); Guido Henri Marguerite Petit, Antwerp (BE)

(73) Assignee: Alcatel, Paris (FR)

( * ) Notice: Subject to any disclaimer, the term of this patent is extended or adjusted under 35 U.S.C. 154(b) by 967 days.

(21) Appl. No.: 09/920,807

(22) Filed: Aug. 3, 2001

(65) Prior Publication Data
US 2002/0018443 A1     Feb. 14, 2002

(30) Foreign Application Priority Data
Aug. 4, 2000   (EP)   .................................. 00402236

(51) Int. Cl.
*H04L 12/66* (2006.01)
(52) U.S. Cl. ................. 370/352; 370/356; 370/470
(58) Field of Classification Search ........ 370/352–356, 370/468, 471, 470, 395.43, 395.41, 395.52, 370/433, 434, 435, 395.5, 389, 401, 465, 370/466, 474
See application file for complete search history.

(56) References Cited

U.S. PATENT DOCUMENTS

| 5,477,542 | A | 12/1995 | Takahara et al. | |
|---|---|---|---|---|
| 6,064,678 | A | 5/2000 | Sindhushayana et al. | |
| 6,650,652 | B1* | 11/2003 | Valencia | 370/433 |
| 6,707,813 | B1* | 3/2004 | Hasan et al. | 370/356 |
| 6,757,256 | B1* | 6/2004 | Anandakumar et al. | 370/252 |
| 6,862,622 | B1* | 3/2005 | Jorgensen | 709/226 |
| 2002/0003793 | A1* | 1/2002 | Poppe et al. | 370/352 |

OTHER PUBLICATIONS

Request for Comments No. 1889 from The Networking Group—Category: Standards track—published on the world wide web at the internet site: http://www.jetf.org/rfc/rfc1889.txt?number =- 1889 entitled "RTP: A Transport Protocol for Real Time Applications", Jan. 1996.
Request for Comments 1890 from The Networking Group—Category—Standards Track—Jan. 1996, entitled "RTP Profile for Audio and Video Conferences with Minimal Control".

* cited by examiner

*Primary Examiner*—Ajit Patel
(74) *Attorney, Agent, or Firm*—Sughrue Mion, PLLC

(57) ABSTRACT

A method of a real time data communication via a real time data over communication network, including the steps of transmitting at least two packets from source to destination, and determining by the destination for each one of the at least two packets, time information related to a receiving time of the packet. The source applies a predefined packet length to each packet, and the destination determines, according to the determined time information and the packet length, the characteristics of a first relation between a packet length and a source to destination delay. The destination also determines a preferred mouth to ear delay according to a preferred quality rating for the data communication, and also determines an optimal packet length to be used by the source for the preferred mouth to ear delay and according to the characteristics of the first relation.

12 Claims, 1 Drawing Sheet

METHOD TO HAVE A REAL TIME DATA COMMUNICATION

BACKGROUND OF THE INVENTION

The present invention relates to a method to have a real time data communication via a real time data over Internet Protocol IP communication network as described in the preamble of claim 1 and to a source and destination realizing such a method as described in the preamble of, respectively, claim 5 and claim 9, and to a communication network that comprises such a source and such a destination as described in the preamble of claim 11.

Such a method, source, destination and real time data over Internet Protocol communication network are known in the art, e.g. from the *Request for comments number* 1889—*from the Networking Group—Category: Standards Track*—published on the world wide web at the Internet site:www.ietf.org/rfc/rfc1889.txt?number=1889 with title "*RTP: A Transport Protocol for Real Time Applications*". Therein, in paragraph 1, at page 3, a Real Time Transport Protocol RTP that provides end-to-end delivery services for data with real time characteristics is described. The real time data, such as interactive audio and video, is transported in a data flow of Real Time Protocol over Internet Protocol packets. Paragraph 2 of the document, starting at page 5, describes some Real Time Protocol scenario's and paragraph 3, page 7 to page 9 of the document describes the definitions that are used in this technological domain.

The encapsulation of the real time data into RTP packets and furthermore into IP packets is realized in a source. Such a source can be comprised in e.g. a user terminal or a gateway. On the other hand, a destination is enabled to de-capsulate the real time data.

It has to be explained that usually as data of a real time data communication travels across the Internet, a User Datagram Protocol UDP is used to take care of the conversation between the end-to-end entities on the source and the destination. The user datagram protocol UDP encapsulates the RTP packets whereby the UDP packets on its turn are encapsulated into IP packets.

It is known in the art that the main job of the Internet Protocol is to deliver IP packets. However, IP is based on an unreliable connectionless delivery service. So, the user has to install himself additional reliability if a secure service is required. This is for the example of the Real Time Protocol realized by means of RTP Control Protocol reports i.e. RTCP packets. The primary function of these RTCP packets is to provide feedback on the quality of the data that is distributed by the source to the destination. This is described in Section 6 of the above mentioned RFC 1889—more particular on page 14.

In this way receiving time information that is related to a receiving time of a packet is determined by a receiving means of the destination and can be returned by means of such a receiver RTCP report to the source. This is described in section 6.3.1 SR: Sender Report RTCP packet—page 23 to page 26—of the above mentioned RFC 1889.

In this way, a method to have a real time data communication between a first user of a source and a second user of a destination via at least partly a real time data over Internet Protocol communication network comprises the steps of transmitting packets by a transmitting means of the source to the destination and determining by a receiving means of the destination, time information that is related to a receiving time of the packets.

Such a source and/or destination that is enabled to encapsulate and/or de-capsulate real time data into IP packets can be located in the network at different places. Indeed, a source might be comprised in e.g. a terminal of a user i.e. a personal computer or a gateway that acts as a virtual source for e.g. a telephone terminal.

Such a real time data source comprises some pre-configured parameters. Indeed, in order to work according to such a real time data protocol a real time data source comprises some pre-configured parameters such as the data packet-length that is used to generate the real time data protocol packets and the type of codec that is used to encode the real time date. Also the level of echo cancellation of the installed echo chancellor in the source is a pre-configured parameter.

These parameters, among others, are however predetermining a user quality that a user at the destination experiences. Indeed, it has to be explained that a predefined packet length of a real time protocol packet has an impact on the mouth-to-ear delay of the real time data communication. In the event of transporting real time data into smaller packets, less time is needed to encode and to encapsulated the data at the source and less time is needed to de-code and to de-capsulate the data at the destination. A user at the destination will perceive a better user quality. In this way the user quality, predetermined by the design parameters of the source, might be sufficient but might be as well inadequate for the actual real time data communication.

On the other hand, however, the packet size of a real time data packet also has an impact on the gross bandwidth that is used in order to transport a predefined amount of real time data. This means that the real time data bit rate plus the overhead bit rate that is consumed by the real time data communication is bigger in the event of smaller packets. Indeed, in the event of transporting a predefined amount of data as a whole into one real time data packet i.e. one real time protocol packet header with one big packet payload comprising this amount of data, less bandwidth is used since only one packet header is required. In the event of transporting this identical predefined amount of data into different but smaller real time data protocol packets i.e. different packets with each time a packet header and a part of the amount of data, more bandwidth is used since different packet headers are required. Furthermore, besides the used bandwidth to transport the real time data over a communication link, the bandwidth left for data applications that are simultaneously active with the real time data communication is smaller. Such other data applications are e.g. a file transfer or web browsing that is executed in parallel with e.g. a voice communication. It has to be explained here that transporting simultaneously these different data applications over one physical communication link requires a scheduling of the data of these different applications. This scheduling might be performed by different devices in the network e.g. a scheduler comprised in a personal computer or an integrated access device that multiplexes different data streams of different applications into one data stream. According to protocols that are usual installed at such a scheduler or integrated access device, the received real time data gets priority upon the received non-real time data during the scheduling and multiplexing. Hereby it becomes clear that for a predefined smaller packet length of a real time data protocol application that generates a rather big consumption of gross bandwidth, less bandwidth is left for other active data applications.

In this way, it is explained that by choosing and installing the predetermined design parameters of the source, a quality of the real time data communication perceived by the destination is predetermined and also the efficiency of the used bandwidth to transport the real time data is predetermined.

SUMMARY OF THE INVENTION

An object of the present invention is to provide a method to have a real time data communication between a first user of a source and a second user of a destination of the above known type but wherein a user gets a choice between the desired quality rating of the real time data communication and the bandwidth left for other active data applications.

According to the invention, this object is achieved by the method of claim 1 that is realized by the source of claim 5 and the destination of claim 9 which are comprised in the communication network of claim 11.

Indeed, by further comprising in the above known method the steps of
  applying by the transmitter of the source for at least two transmitted packets a predefined packet length out of a plurality of packet lengths, and
  determining by a first determining means, according to each determined time information associated to at least two packets of the receiving means, and according to each predefined packet length associated to the at least tow packets, characteristics of a first relation between a packet length of a packet to be transmitted from the source to the destination and a source to destination delay being a time period between the transmission of the packet by the source and reception of the packet by the destination; and
  determining by a second determining means a preferred mouth to ear delay according to a preferred quality rating for the real time data communication; and
  determining by a third determining means an optimal packet length for the preferred mouth to ear delay and according to the characteristics of the first relation in order to be applied by the source for packets being transmitted during the real time data communication,
a choice is made for a preferred quality rating whereby an optimal packet length is determined in order to be applied for the real time data communication whereby the bandwidth left for other applications simultaneously active with the real time data application is imposed.

A choice is provided to a user e.g. the first user or the second user for their desired quality rating by means of e.g. a button installed on the real time data terminal or a pre-signaled and/or pre-stored set of user preferences on the above mentioned gateway.

According to the user its choice, a preferred mouth to ear delay bound is determined. This is determined by the second determining means and might be implemented by means of e.g. the known E-model. This E-model is known from '*The E-model, a computational model for use in transmission planning*' with reference, ITU-T recommendation G.107, May 2000. The E-model predicts the subjective quality that will be experienced by an 'average' listener. The E-model is used to calculate a quality rating for packetised telephony starting from the parameters describing the operation of the transmission stages the voice packets go through. Every rating value corresponds to a speech transmission category e.g. best quality, medium quality or poor quality. In this way a relation between subjective quality and mouth-to-ear delay can be dimensioned and implemented in the second determining means whereby upon provision of a preferred quality rating, a preferred mouth to ear delay is determined. It has to be explained that the installed echo canceller at the source plays a role to dimension the above relation.

It has to be clear that the preferred quality rating might be expressed by e.g. the first user or the second user. In the event when the second user expresses the quality rating, it has to be clear that an extra interface is required from the destination to the second determining means.

Furthermore, a relation between source to destination delay and packet size is built up through measurements. A plurality of test packets with e.g. increasing packet size is transmitted by the source to the destination.

Similar as above, it has to be clear that the initialization to start transmission of the test packets might be expressed by e.g. the first user or the second user. In the event when the second user expresses the quality rating, it has to be clear that an additional interface is required from the destination to the source S.

As explained above, the relation between source-to-destination delay and packet size is an increasing function. The first determining means determines the characteristics of this increasing function on the basis of the measured time information related to a receiving time of the destination of the test packets and the associated packet length of each packet. These characteristics e.g. in the event of a linear function the offset and the slope, are provided to the third determining means that determines for the preferred mouth-to-ear delay and according to the characteristics of the first determining means, the optimal packet length. Upon application of the optimal packet length for the packets of the real time data communication, maximal bandwidth efficiency is reached for the desired quality rating.

Although the above describes a real time data communication between a source and a destination via a real time data transport protocol over Internet Protocol communication network, the invention applies also when only a real time data transport protocol over Internet Protocol is applied only at the source and at the destination itself. This means that in between both elements other kinds of protocols might be applied in order to transport the real time data from the source to the destination. For example a source might be implemented by a VoIP terminal whereby voice is digitized and encapsulated according to a real time data transport protocol over Internet Protocol and transmitted by a transmitter. In parallel a second terminal or alternatively a second transmitter in the VoIP terminal transmits a data file according to the Internet Protocol. The IP packets of the voice data and the IP packets of the data file are multiplexed by a scheduler. This stream of IP packets is not transported via an IP based network but is packed by an Asymmetric Digital Subscriber line network terminator ANT into asynchronous Transfer Mode ATM cells in order to be transported according to the ADSL techniques. Although that in this way, only between the voice transmitter and the ADSL network terminator the real time data is transported via VoIP with a Real Time Data protocol, the method according to the present invention can be used. Indeed, since the transmitter of the source uses a real time protocol over IP protocol, an interference upon the packet length of a real time data packet is enabled whereby the transmitter might apply the determined optimal packet length in order to install the preferred quality and related bandwidth efficiency.

A further aspect of the invention is that a source has an intrinsic delay, which is the time needed to generate the real time data packets for transmission to the destination. This intrinsic source delay must be taken into account as part of the global mouth-to-ear delay in order to determine the optimal packet length. This intrinsic delay depends of the installed codec bit rate, encoding type and the applied packet length. A fourth determining means determines by means of source intrinsic information e.g. encoding delay and installed codec bit rate the relation between packet length and intrinsic source delay. In this way the method further comprises, determining by the third determining means the optimal packet length also according to characteristics of the second function which are determined and provided by a fourth determining means according to a relation between a packet length and an intrinsic source delay. This is described in the method of claim 2 that is realized by the source of claim 6.

A possible way to provide the characteristics of the first relation from the first determining means to the third determining means is according to the above mentioned real time transport protocol control protocol. This is described by the method of claim 3. Indeed, the reports described in the above cited RFC 1889 can be adapted in order to be used to transfer the characteristics from the first determining means to the third determining means. It has to be remarked here that the method according to the present invention is however not limited to transport of real time data into the above mentioned real time data protocol according to RFC 1889. Other real time data transport protocols of which the packet length of the data packets can be adapted might be used to apply the present invention.

During prosecution of the real time data communication it is possible that the preferred quality rating is tuned to an actual situation. This will become more clearly with the following example. Presume that a voice over internet protocol application is ongoing between a first user and a second user, both from their VoIP terminal. According to the preferred quality rating, the bandwidth efficiency is determined and installed by means of applying the optimal packet length that have been determined according to the method of the present invention. Presume that during the voice call the first user desires to transmit from its terminal, as soon as possible, a certain file that both users were discussing about. In order to transmit the file rather quickly the first user (for this example) tunes the preferred quality rating to a lower level. According to the method of the present invention an adapted optimal packet length is determined. This packet length is applied by the source for the voice packets of a next part of the conversation, thereby transporting the voice packets more efficiently and leaving more bandwidth for the file transfer. In this way, although with a lower subjective quality, the conversation can be continued between both users, while the file can be transferred from the source to the destination at a higher bandwidth. When the file transfer is completed the first user tunes the quality level again at a higher level, whereby again an adapted optimal packet length is determined for application on the voice packets of the last part of the conversation. This is described in claim 4.

Furthermore, it has to be explained that, although according to the present invention the second determining means and the third determining means are not necessarily comprised in the source, both functional blocks might be comprised in the source. This is described in claim 7.

In a similar way, the fourth determining means, that is according to the present invention not necessarily comprised in the source and that determines the relation between packet length and intrinsic source delay might according to a preferred implementation be comprised in the source. This is described in claim 8.

Finally, also the first determining means can be comprised according to a preferred embodiment into the destination itself. This is described in claim 10.

It also has to be explained that a suitable embodiment for both users of a real time data communication is that the method according to the present invention is used in both directions. In this way, an optimal packet length in one direction is applied and another optimal packet length in the other direction is applied whereby the bandwidth in both directions is efficiently used.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path e.g. a physical link or an air interface between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
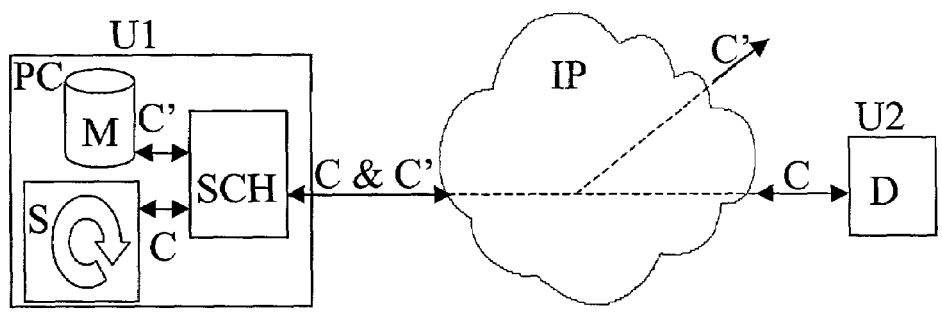
FIG. 1 represents a communication network and FIG. 2 shows the interactive working of the source with the destination and the different determiners according to the present invention.
Figure 2:
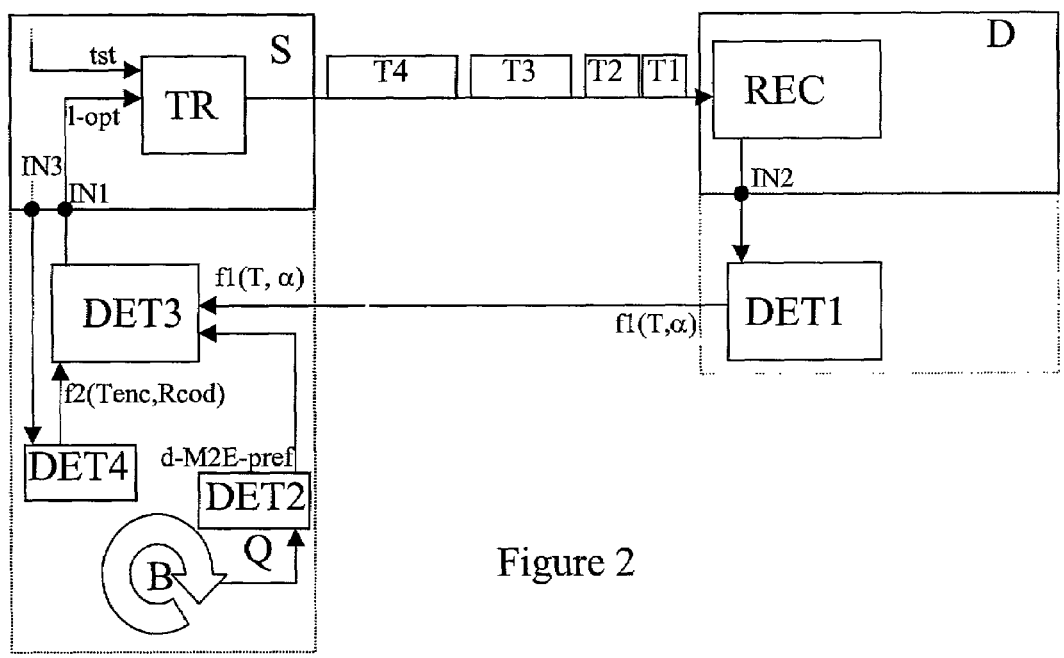

The working of the device according to the present invention in accordance with its telecommunication environment that is shown in FIG. 1 and FIG. 2 will be explained by means of a functional description of the different functional blocks as shown therein. Based on this description, the practical implementation of the blocks will be obvious to a person skilled in the art and will therefor not be described in detail. In addition, the principle working of the method to have a real time data communication according to the present invention will be described in further detail.

Referring to FIG. 1, a telecommunication network is shown. As it is explained above, between the source S of user 1 and the destination D of user 2, different kind of networks might be implemented as long as at the source S and at the destination D a real time data protocol over Internet protocol is implemented. This means the source S must be enabled to encapsulate data into real time data protocol packets and that the destination must be enabled to receive these real time data protocol packets.

In order to show clearly the improvement of the current invention, it is preferred to implement the source S in a personal computer PC. The personal computer PC comprises also a memory M and a scheduler SCH. The memory and the source S are both coupled to the scheduler SCH. The scheduler is coupled to an output of the personal computer PC. The personal computer is coupled to the outside Internet world. The source S comprises a microphone (not shown) to receive voice (real time data).

The memory M is implemented by means of a disk in order to store data files. These data files are accessed by means of a data application program but is not further described here in details since this goes beyond the aim of the present invention. The aim is that a file transfer might happen by the personal computer in parallel with the voice transfer.

By means of an example user U1 and user U2 are going to set up a communication C and furthermore is user U1 going to transmit a data file via a communication C' to a third user (not shown).

The destination D of user U2 is also coupled to the Internet world and is a VoIP terminal to receive the voice data of user U1.

The scheduler SCH is comprised to schedule the data packets received from the source S and from the memory M in the event when both devices are indeed transmitting packets. The scheduler SCH gives a higher priority to packets from the source i.e. real time data packets over the packets from the memory i.e. non real time data packets. According to this rule the bandwidth is shared on the common link between the scheduler and the first access device (not shown) to the IP network. FIG. 1 shows the situation of transmission of both data packet streams C&C' on this common link. The IP packet stream generated by the scheduler SCH is transmitted over the IP network. The IP packets comprising the real time data of the real time data communication C are routed towards the destination D and the IP packets comprising the data packets of the data file are routed towards another user (not shown).

According to the method of the present invention, user U1 and user U2 are setting up a real time data communication C whereby a user, in this preferred embodiment user U1, gets a choice between the desired quality rating for this real time data communication C and the bandwidth left for other active data applications such as e.g. the above mentioned file transfer within the communication C'.

This will become more clearly in the following paragraphs.

Referring to FIG. 2, the required functional blocks and interfaces of the source S and of the destination D in order to implement the present invention are shown.

The source S comprises a transmitter TR, a button B and a first interface IN1, a third interface IN3.

The transmitter TR comprises two inputs and one output. A first input is comprised to receive a control signal tst. A second input is coupled to the first interface IN1 that is comprised in the source S in order to interface with a packet length determiner (third determining means) DET3. The packet length determiner (third determining means) DET3 is on its turn coupled to a relation determiner (first determining means) DET1, a delay determiner (second determining means) DET2 and an intrinsic relation determiner (fourth determining means) DET4. The delay determiner DET2 is also coupled to the button B. The third interface IN3 is comprised in the source S to interface with this intrinsic relation determiner (fourth determining means) DET4.

The destination D comprises a receiver REC and, coupled thereto, a second interface IN2 to interface also with the relation determiner DET1.

The transmitter TR of the source S is coupled via its output and a telecommunication network to the receiver REC of the destination D.

As preferred embodiment, the above mentioned relation determiner DET1 is comprised in the destination D and the delay determiner DET2, the intrinsic relation determiner DET4 and the packet length determiner DET3 are comprised in the source S.

The transmitter TR is comprised in the source S to transmit test packets T1, T2, T3 and T4 to the receiver REC. Each test packet has a predefined packet length. According to the present embodiment, it is preferred to use four test packets T1, T2, T3 and T4 and to apply to these test packets the lengths l1, l2, l3 and l4, respectively, which are increasing values according to the sequence of transmission of the test packets T1, T2, T3 and T4. These test packets might be transmitted at set-up of the desired communication C or during this communication C. An initiation of transmission of the test packets is realized with the control signal 'tst' at the transmitter TR. This will be explained in more details in a further paragraph.

The receiver REC is comprised in the destination D to receive the test packets and to determine for each test packet time-information T1_t1, T2_t2, T3_t3 and T4_t4 that is related to the receiving time of the respective test packet. The time information related to the receiving time e.g. T3_t3 of a packet T3 is, according to the present embodiment, a value of a clock counter (not shown) i.e. the receiving time itself t3.

The receiver REC is further comprised to provide for each packet e.g. T3 its associated packet length e.g. l3 (not shown) and associated time information e.g. T3_t3 to the relation determiner DET1.

The relation determiner DET1 determines according to the received information from the receiver REC characteristics of a first relation $f1(T,\alpha)$. This first relation f1 is a relation between a packet length of a packet to be transmitted from the source S to the destination D and a source to destination delay d-S2D that is the time period between the transmission of the packet by the source S and reception of the packet by the destination D. Firstly the source to destination delay d-S2D must be determined. Since the time information e.g. T2_t2 of a packet T2 is the receiving time t2 of the packet T2, the source to destination delay d-S2D is determined by subtracting a timestamp from the source S in the packet header of this RTP packet T2 from the receiving time t2. In this way the source to destination delay is determined for each test packet.

It has to be explained that this relation f1 is substantially a linear relation that is specified by the values for its characteristics offset T and slope $\alpha$. This means that the relation determiner DET1 first determines the linear relation between the received values of packet length and the received values of receiving time and specifies herewith the values for offset T and slope $\alpha$. These values of the characteristics of the first relation $f1(T, \alpha)$ are provided by the relation determiner DET1 to the packet length determiner DET3.

According to this described implementation it is user U1 who indicates the preferred quality rating Q by means of the button B at the source S. In this way the user U1 is enabled to express its preferred quality for the communication C he desires to have with user U2. This preferred quality-rating Q is provided to the delay determiner DET2. The delay determiner DET2 determines a preferred mouth to ear delay d-M2E-pref according to the preferred quality rating Q and provides this preferred mouth to ear delay d-M2E-pref to the packet length determiner DET3. The delay determiner DET2 determines this preferred mouth to ear delay d-M2E-pref according to pre-stored information regarding the above described E-model.

It has to be explained that a further aspect of the present invention is that a user U2 of the destination D could also have been enabled to express its preferred quality for the actual communication C. Such an embodiment might be implemented with an interface e.g. a button at the destination D to receive from user U2 its preferred quality rating whereby this preferred quality rating must be provided to the delay determiner DET2.

The intrinsic relation determiner DET4 determines the second relation f2 between the intrinsic source delay and the packet length of a packet that must be encoded and encapsulated. This relation f2(Tenc, Rcod) is a substantial linear relation whereby the offset Tenc is determined by the encoding delay and the slope Rcod is determined by the codec bit rate. The characteristics of this second relation f2(Tenc,Rcod) are provided by the intrinsic relation determiner DET4 to the packet length determiner DET3.

The packet length determiner DET3 determines according to the received characteristics of both relations f1(T,α) and f2(Tenc,Rcod) an optimal packet length for the received preferred mouth to ear delay d-M2E-pref. This optimal packet length is provided via the first interface IN1 to the transmitter TR of he source S which applies this optimal packet length for the length of the real time data packets in the internet packets according to the real time data protocol.

In this way according to a preferred quality rating Q an optimal packet length l-opt is determined for application by the source S, whereby the used bandwidth on the common link that is used to transfer the voice is determined accordingly. The user U1 is enabled to tune the preferred quality rating Q as good as he wants whilst keeping in mind that a better quality goes at the expense of the used bandwidth for the voice application whereby less bandwidth is left for eventual active other applications such as the data transfer from the memory M.

It has to be explained here that an optimal packet length is determined and re-determined each time when an input value for the packet length determiner DET3 changes. Such a change might be e.g. a new value for the preferred mouth to ear delay, new values for characteristics of the first relation f1 or new values for characteristics of the second relation f2.

In the following paragraph the principle working of the present invention will be explained by means of a description of the above-mentioned scenario.

At call set up of communication C, user U1 installs a preferred quality Q with its button B. This leads finally to an application of the determined optimal packet length l-opt that is used during the communication C. Hereafter different situation are described wherein an adapted optimal packet length is determined by the packet length determiner DET3 in order to be applied for a next part of the communication C.

Presume that the IP network transmits the IP packets of the communication C over a best-effort IP sub-network and that during the communication C congestion occurs in this sub-network. The subjective quality experienced by user U2 will suffer from this congestion whereby user U1, eventually upon request of user U2 via the communication C, can do initialize two actions to correct this subjective quality.

A first action is tuning the button B whereby a new preferred quality rating Q is installed with the above-explained consequences of applying a new optimal packet length. However, another action might be initiating the process to start transmission of the test packets and to determine the characteristics of the first relation f1 again. This is realized via a user interface in order to set the control signal tst. Hereby the four test packets are transmitted again by the transmitter TR whereby the destination is enabled to determine again the characteristics of the first relation f1 for provision to the packet length determiner DET3 of the source S. An adapted optimal packet length is determined whereby the subjective quality of the communication C is reestablished.

Finally, multiple access methods in future communication systems will be capable of taking advantage of reduction in average bit rate by exploiting the highly time-varying nature of speech. This motivates the increasing interest for efficient variable rate speech coding techniques. This means that for example the codec bit rate Rcod of a source S might be adapted during a communication C dependent on what exactly is said by the users U1 and U2. Indeed, by producing complicated speech patterns a higher bit rate might be needed as in the event of speaking only simple words. In this way the intrinsic delay determiner DET4 generates new values for the characteristics of the second relation F2 whereby again a new optimal packet length is determined for application during the next part of the conversation C.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method of a real time data communication between a first user of a source and a second user of a destination at least partly via a real time data transport protocol over Internet Protocol communication network, said method comprising:
   transmitting by said source at least two packets to said destination; and
   determining by said destination for each one of said at least two packets, time information related to a receiving time of said packet,
wherein said method further comprises:
   applying by said source, for each one of said at least two packets, a predefined packet length out of a plurality of packet lengths;
   determining, according to said time information and according to each said predefined packet length, characteristics of a first relation between a packet length of a packet to be transmitted from said source to said destination and a source to destination delay which is a time period between said transmission of said packet by said source and reception of said packet by said destination;
   determining a preferred mouth to ear delay according to a preferred quality rating for said real time data communication; and
   determining an optimal packet length for said preferred mouth to ear delay and according to said characteristics of said first relation for packets being transmitted during said real time data communication.

2. The method according to claim 1, wherein said step of determining said optimal packet length further comprises determining said optimal packet length also according to characteristics of a second function, said characteristics of said second function being determined according to a relation between a packet length and an intrinsic source delay.

3. The method according to claim 1, wherein said characteristics of said first relation are determined by a first determining means and said optimal packet length is determined by a third determining means, and wherein said method further comprises a step of providing said characteristics of said first relation from said first determining means to said third determining means by using reports of a real time transport protocol control protocol.

4. The method according to claim 1, further comprising the steps of tuning said preferred quality rating during said real time data communication, repeating said steps of said method and determining thereby an adapted optimal packet length to be applied by said source for packets being transmitted during a following part of said real time data communication.

5. A source for use by a first user to communicate at least partly via a real time data transport protocol over Internet Protocol communication network with a second user of a destination, said source comprising a transmitter which transmits at least two packets to said destination in order to enable a receiver at said destination to determine, for each one of said at least two packets, time information related to a receiving time of said each one packet, wherein
said transmitter uses for each packets a predefined packet length out of a plurality of packet lengths, and
said source is responsive to an optimal packet length input to apply an optimal packet length for packets being transmitted during said real time data communication, said optimal packet length being determined in accordance with a preferred mouth to ear delay and in accordance with characteristics of a first relation between a packet length of a packet to be transmitted from said source to said destination and a source to destination delay which is a time period between transmission of said packet by said source and reception of said packet by said destination, said first relation being determined according to time information associated with each one of said at least two packets and according to each said predefined packet length associated with said at least two packets, said preferred mouth to ear delay being determined according to a preferred quality rating for said real time communication.

6. The source according to claim 5, further comprising a third interface to provide source intrinsic information in order to enable determination of characteristics of a second function which is a relation between a packet length and an intrinsic source delay, and to provide said characteristics of said second function for use in determining said optimal packet length also according to said characteristics of said second function.

7. The source according claim 5, wherein said source comprises means for determining at least one of said optimal packet length and said preferred mouth to ear delay.

8. The source according to claim 6, wherein said source comprises means for determining said characteristics of said second function.

9. A destination for use by a second user to communicate at least partly via a real time data transport protocol over Internet Protocol communication network with a first user of a source, said destination comprising a receiver which receives at least two packets from said source in order to determine for each one of said at least two packets time information related to a receiving time of said each one packet, wherein:
for each one of said at least two packets said source applies a predefined packet length out of a plurality of packet lengths; and
said receiver further comprises an interface to provide said time information in order to enable determination, according to each said time information associated with said at least two packets, and according to each said predefined packet length associated with said at least two packets, characteristics of a first relation between a packet length of a packet to be transmitted from said source to said destination and a source to destination delay which is a time period between said transmission of said packet by said source and reception of said packet by said destination; and in order to enable determination of an optimal packet length for a preferred mouth to ear delay according to said characteristics of said first relation and to enable thereby said source terminal to apply said optimal packet length for transmission of packets of said real time data communication, said preferred mouth to ear delay being determined according to a preferred quality rating for said real time data communication.

10. The destination according to claim 9, wherein said destination further comprises means for determining said characteristics of said first relation.

11. A communication network wherein said network comprises a source according to claim 5.

12. A communication network wherein said network comprises a destination according to claim 9.

* * * * *